United States Patent
Song et al.

(10) Patent No.: US 7,684,769 B2
(45) Date of Patent: Mar. 23, 2010

(54) DATA COMMUNICATION APPARATUS AND MODULE USING HUMAN BODY

(75) Inventors: Seong-Jun Song, Daejeon (KR); Namjun Cho, Daejeon (KR); Sunyoung Kim, Daejeon (KR); Hoi-Jun Yoo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 610 days.

(21) Appl. No.: 11/637,724

(22) Filed: Dec. 13, 2006

(65) Prior Publication Data
US 2007/0140120 A1 Jun. 21, 2007

(30) Foreign Application Priority Data
Dec. 16, 2005 (KR) .................. 10-2005-0124703

(51) Int. Cl.
H04B 1/034 (2006.01)
H04B 1/02 (2006.01)
(52) U.S. Cl. .................. 455/100; 455/95; 455/106
(58) Field of Classification Search ................. 455/100, 455/91, 95, 41.2, 106, 344, 41.1, 575.6; 607/32, 607/60
See application file for complete search history.

(56) References Cited

U.S. PATENT DOCUMENTS 3,808,502 A * 4/1974 Babilius ................. 361/1
6,211,799 B1 * 4/2001 Post et al. ................. 341/33
6,223,018 B1 * 4/2001 Fukumoto et al. .......... 455/41.1
6,754,472 B1 6/2004 Williams et al.
6,771,161 B1 * 8/2004 Doi et al. .................. 340/5.64
7,171,177 B2 * 1/2007 Park et al. ................ 455/188.1
7,263,295 B2 * 8/2007 Shinagawa et al. .......... 398/135
7,430,374 B2 * 9/2008 Shinagawa et al. .......... 398/135
7,480,492 B2 * 1/2009 Williams et al. ............ 455/100
7,493,047 B2 * 2/2009 Shinagawa et al. .......... 398/135

FOREIGN PATENT DOCUMENTS

WO    WO 2009/078557 A1 *  6/2009

OTHER PUBLICATIONS

Shinagawa, Mitsuru et al. "A Near-Field Sensing Transceiver for Intrabody Communication Based on the Electrooptic Effect," IEEE Transactions on Instrumentation and Measurement, vol. 53, 1533-1538 pp, (Dec. 2004).

* cited by examiner

*Primary Examiner*—Sonny Trinh
(74) *Attorney, Agent, or Firm*—Oliff & Berridge, PLC

(57) ABSTRACT

In circumstance of a wearable computing system, in order to effectively transfer data between electronic devices using electric property of human body, minimization, low power, and high-speed are required. Human body data communication apparatus and module using broadband signaling technology is provided to perform high-speed peer-to-peer data communication with a signal electrode and low power. The apparatus and module have a direct coupling interface with a single electrode without an antenna and a sensor, and a transmitter transmitting digital signal without modulation, and a receiver recovering a clock and data by detecting a broadband pulse signal.

7 Claims, 4 Drawing Sheets

DATA COMMUNICATION APPARATUS AND MODULE USING HUMAN BODY

BACKGROUND OF THE INVENTION

1. Field of the Invention

The present invention relates to a data communication apparatus using human body and a data communication module thereof, and more particularly, to a peer-to-peer data communication apparatus easily applied to a data communication field between wearable computer systems or mobile electronic devices in human body and a data communication module thereof.

2. Description of the Related Art

A human body communication is a technology of realizing a data communication using human body instead of a data communication cable, and there is one using variation of current flowing through the human body and the other using a variation of a surface electric field of the human body. Since the human body communication can precisely restrict the communication range and the other party to be communicated with, differently from a telephone communication and a wireless communication, and the human body communication has a low risk of a crossed line and a wiretap as opposed to a telephone and a wireless communication and enables a communication with naked hands. Due to these reasons, the human body communication is being vigorously researched recently.

Meanwhile, within a human body area, there are roughly two types of the data communication between mobile electronic devices such as a wired data communication and a radio frequency (RF) data communication. The wired data communication is advantageous as it is capable of carrying out a high-speed data communication without external noise interference, but has a restriction of inconvenience used within the human body and a spatial restriction. On the other hand, a personal RF data communication such as Bluetooth and Zigbee can solve the above-mentioned inconvenience and spatial restriction, but can be used in only a low-speed data communication due to a weakness of the external noise interference and a relatively large transfer error and has a problem with a battery due to a large power consumption.

In order to solve the above-mentioned problems, M. Shinagawa et al. have proposed a high-speed human body communication technique through the human body as a data transfer medium using an electrical property of the human body (M. Shinagawa et al., "A Near-Field-Sending Transceiver for Intrabody communication Based on the Electrooptic Effect", IEEE Transactions on Instrumentation and Measurement, vol. 53, pp. 1533-1538, December 2004).

FIG. 1 is a block diagram illustrating a principle of a conventional human body communication system proposed by Shinagawa et al. As illustrated in FIG. 1, a transmitting and receiving unit 110 of a human body communication system 100 includes a pair of signal electrode 180 and a ground electrode 120 such that a ground coupling is carried out between a transmitting unit and a receiving unit through a ground below the transmitting unit and the receiving unit. The transmitting unit 112 having a transmitter circuit directly transmits a digital signal to the human body without modulation. The receiving unit 114, since intensity of an electric field generated in the human body is very weak and unstable, uses an electrooptical sensor 116 to recover electric field into the digital signal in order to increase a reception sensibility. Using this method, the high-speed data communication through the human body is enabled, but an external sensor such as the electrooptical sensor 116, difficult to be made in the form of an integrated chip, and the ground electrode 120 are required so that it is difficult to minimize the data communication apparatus and the power consumption is increased. In other words, this method has a difficulty in minimization and achieving low power consumption.

SUMMARY OF THE INVENTION

Therefore, the present invention has been made in view of the above and/or other problems, and it is an aspect of the present invention to provide a data communication apparatus using human body and a module thereof convenient to use, capable of being minimized, of enabling a high-speed data communication with a low power, being less sensitive to a low frequency noise, and of enabling a stable data communication regardless of a size of electrodes and a status of a human body.

In accordance with the present invention, the above and other objects can be accomplished by the provision of a data communication apparatus using human body including: a signal electrode capable of contacting the human body; a transmitting unit to transfer a digital data signal without modulation to the human body through the signal electrode; a receiving unit to detect a broadband pulse signal generated by the human body; a host interface to process a data signal to be transferred to the receiving unit and to transfer the processed data signal to the transmitting unit, and to allow the broadband data signal detected by the receiving unit to be processed at the exterior; and a single battery to supply an electric power to the data communication apparatus using human body.

The receiving unit includes: a broadband signaling receiver circuit; a clock recovering circuit to use own clock generator to recover a clock signal having a small jitter with a phase identical to that of a frequency of the broadband pulse data signal received from the broadband signaling receiver circuit; and a data recovering circuit to use the recovered clock signal to recover the broadband data signal into a clean digital data signal.

The broadband signaling receiver circuit has an input impedance of 50 ohm.

The broadband signaling receiver circuit includes: a broadband prefix amplifier to the detected broadband pulse signal generated in the human body to a broadband pulse signal with a sufficient amplitude; a Schmidt trigger to trigger the broadband pulse signal amplified by the broadband prefix amplifier into stable positive and negative statuses; and a level shifter to shift the triggered broadband pulse signal to a broadband pulse signal at a level required by the clock recovering circuit and the data recovering circuit.

The transmitting unit includes: a clock synthesizer to synthesize a clock signal for a human body communication using a clock received from the host interface as a reference clock signal; a data retimer to retime a phase of a data signal received from the host interface to be synchronized with that of the clock signal using the synthesized clock signal; and a transmitter circuit to transfer the retimed data signal to the human body.

In accordance with an object of the present invention, the above and other objects can be accomplished by the provision of a data communication module using human body including: a direct coupling interface formed by an adhesive pad; a signal electrode to contact the human body; a transmitting unit to transfer a digital signal without modulation to the human body through the signal electrode; a receiving unit to detect a broadband pulse signal generated in the human body; a host interface to process a data signal to be transferred to the receiving unit and to transfer the processed data signal to the transmitting unit, and to allow the broadband data signal detected by the receiving unit to be processed at the exterior; and a single battery to supply an electric power to the data communication module using human body; wherein the transmitting unit, the receiving unit, and the host interface are formed in a signal integrated chip, and the signal electrode, the integrated chip, and the battery are installed in the adhesive pad.

Except for a side that the signal electrode faces the human body, the battery, the integrated chip, and the opposite side of the signal electrode are sealed in a vertical configuration by a material identical to that of the adhesive pad.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Prior to the description of embodiment(s) of the present invention, a technical principle of the present invention will be described in brief.

[Broadband Signaling Technology]

In order to carry out a low-power and high-speed data communication through a human body, a human body data communication and a data communication module according to an embodiment of the present invention utilize a broadband signaling technology. According to Shannon's information capacity theory, formula 1 is established.

$$C = B\log_2\left(1 + \frac{S}{N}\right)$$ [Formula 1]

where, C is a maximum channel capacity (b/s), B is a channel broadband width (Hz), S is a power of a signal (W), and N is a power of noise (W). It can be understood that the maximum channel capacity is proportionally increased as the channel broadband width is increased. Thus, the broadband signaling technology proposed in the present invention remarkably increases the channel broadband width in comparison to a conventional communication technology to increase the maximum channel capacity so that the high-speed data communication is enabled. Moreover, since a stable data communication through a human body as a signal transferring medium is possible when the broadband signaling technology is used regardless of external noise and an influence of an electric field, there are advantages to achieve low power and minimization.

[General Principle and Requirement for the Human Body Data Communication]

The present invention relates to a data communication using a human body as a data transferring medium for the data communication between a wearable computing system and mobile communication devices using human body. Human anatomy constituting human body has a component similar to 0.9% saline solution and a weak conductivity to be capable of transferring an electric signal. In order to carry out the data communication using the electric property of human body, since every mobile electronic device is operated by a battery, a size of the battery is reduced, and a signal electrode is attached to the human body instead of an antenna, low power and minimization must be necessary. Moreover, since multimedia information such as audio information and a motion picture must be transferred, the high-speed data communication must be enabled.

Hereinafter, a data communication apparatus using human body and a module thereof according to embodiments of the present invention will be described in detail with reference to the accompanying drawings.

Figure 1:
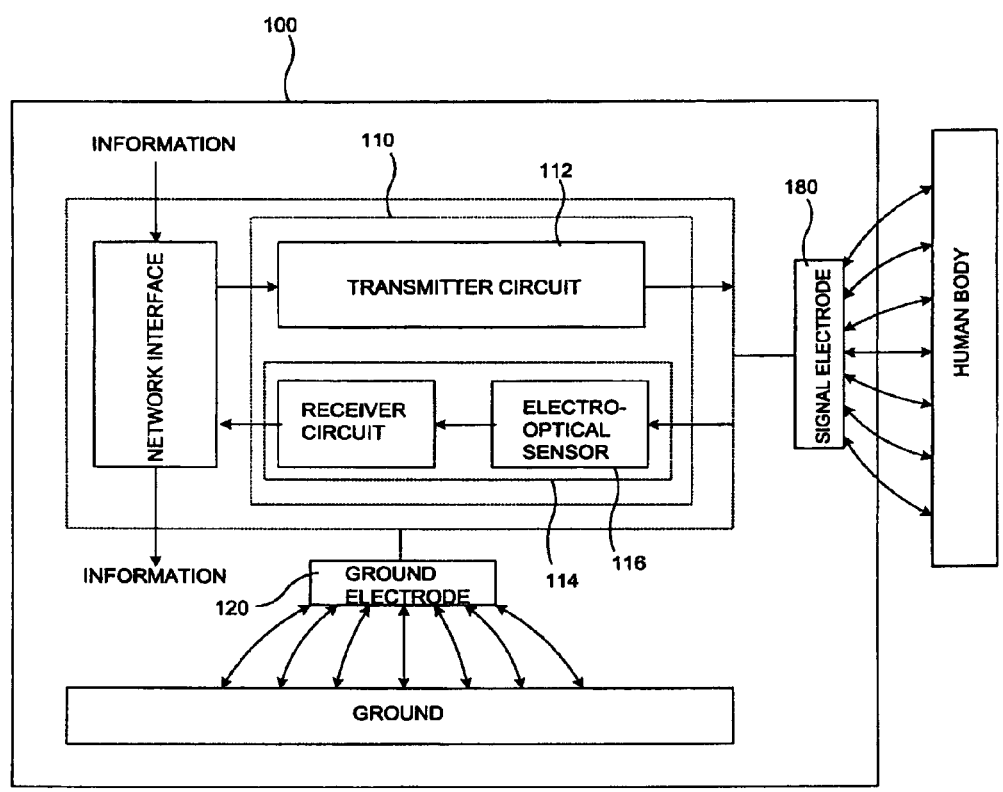
FIG. 1 is a block diagram illustrating a principle of a conventional communication system using human body proposed by Shinagawa et al.
Figure 2:
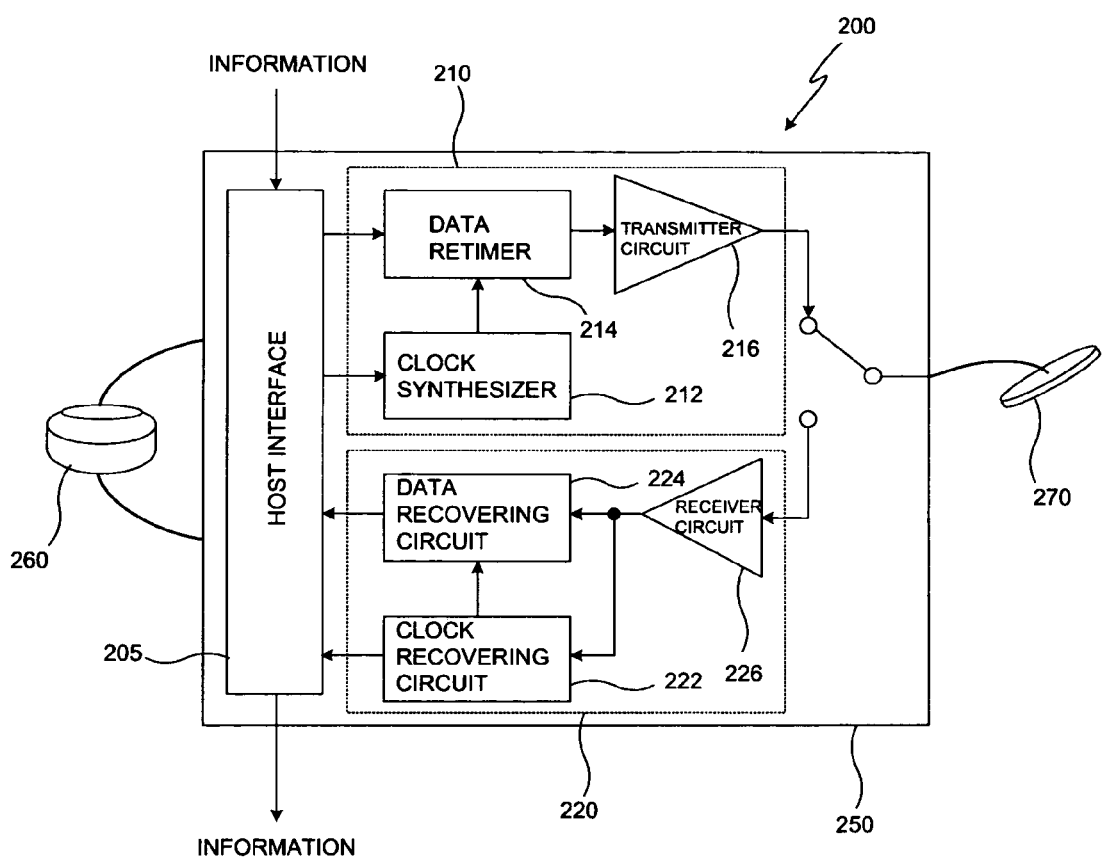
FIG. 2 is a block diagram schematically illustrating an overall configuration of a peer-to-peer data communication apparatus using human body according to an embodiment of the present invention.

FIG. 2 is a block diagram schematically illustrating an overall configuration of a peer-to-peer data communication apparatus using human body according to an embodiment of the present invention. In this communication apparatus 200, a directly coupling interface is formed by using a single battery 260 and a single signal electrode 270 that is directly attached to the human body. As the signal electrode 270, a bio-signal measuring Ag/AgCl electrode or an electrode, made of material through which an electric signal is transferred well, such as a metal plate plated with gold, may be used. The battery 260 may be a small sized button-shaped battery in order to reduce the size of overall system.

The data communication apparatus 200 includes a transmitting unit 210 to transmit a digital signal to a human body and a receiving unit 220 to detect a broadband pulse signal generated in the human body, processes data information to be transmitted to the receiving unit 220 to transmit the processed data information to the transmitting unit 210 through a host interface 205.

Figure 3:
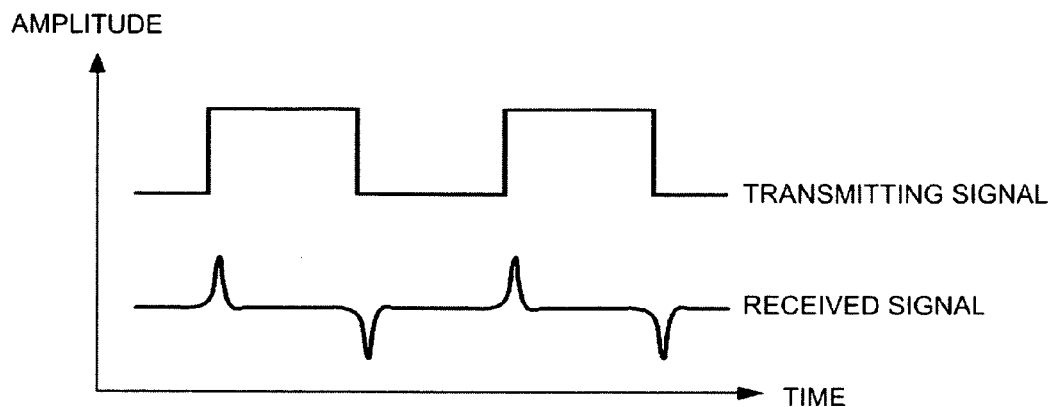
FIG. 3 is a graph illustrating waveforms of a digital signal transmitted from a transmitting unit of FIG. 2 and pulse signal detected by a receiving unit of FIG. 2.

The transmitting unit 210 includes a clock synthesizer 212, a data retimer 214, and a transmitter circuit 216, and effectively transfers the processed data signal to the human body without any modulation. In more detail, a clock received from the host interface 205 is used as a reference clock signal such that the clock synthesizer 212 synthesizes a clock signal for a human body communication. The data retimer 214 uses the synthesized clock signal to retime the data signal again such that a phase of the data signal received from the host interface 205 is synchronized with a phase of the clock signal. The transmitter circuit 216 uses a buffer having a high driving capacity to transfer the retimed data signal to the human body sufficiently. In other words, since the human body plays a role of a big conductor, in order to transfer a signal to the human body, a buffer having a high driving capacity must be used. Since the human body is not a perfect conductor, an electric signal can be transferred, but due to some resistant component, the human body causes reduction of the electric signal from 5 dB to 10 dB. Moreover, since the human body has a property of a broadband pass filter with a broadband width of 100 MHz, a low-frequency signal lower than 10 kHz is remarkably reduced. As illustrated in FIG. 2, since the data communication apparatus using human body includes the direct coupling interface, only a transferring channel using the human body through which a signal is transferred from/to the signal electrode 270 is directly formed between the transmitting unit 210 and the receiving unit 220. Since respective grounds are completely separated from each other, there is no returning path through the grounds. Due to the electrical property of the direct coupling interface and the human body, the receiving unit 220 does not detect the digital signal as it is but as a broadband pulse signal. The broadband pulse signal has a pulse width about 8 ns. For reference, waveforms of the digital signal transmitted from the transmitting unit 210 and the pulse signal detected by the receiving unit 220 are depicted in FIG. 3. Thus, the receiving unit 220 requires a function of detecting the broadband pulse signal and recovering the same into a digital signal.

The receiving unit 220 roughly includes a broadband signaling receiver circuit 226, a clock recovering circuit 222, and a data recovering circuit 224. The broadband signaling receiver circuit 226 plays a role of an analog front-end (AFE) of the receiving unit 220.

Meanwhile, a reference numeral 250 in FIG. 2 is assigned to a unit that may be made of an integrated chip in the communication apparatus according to the embodiment of the present invention.

Figure 4:
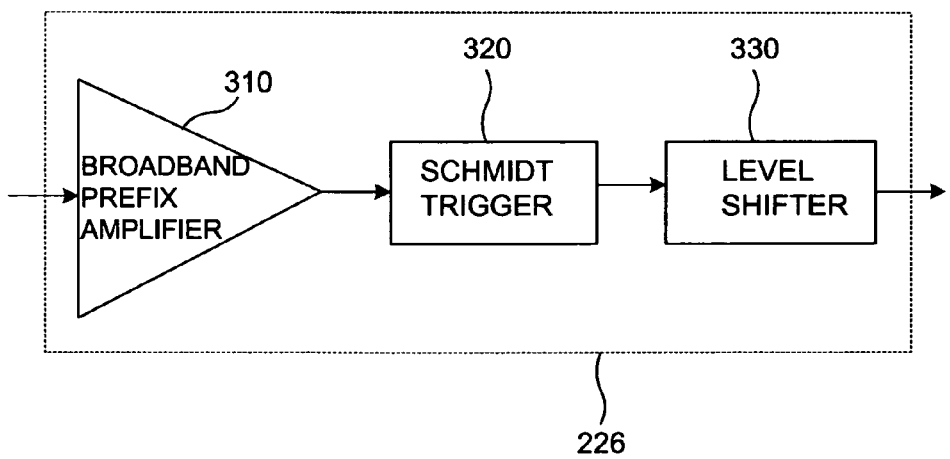
FIG. 4 is a block diagram schematically illustrating the receiver circuit in FIG. 2.

FIG. 4 is a block diagram schematically illustrating the receiver circuit 226 in FIG. 2. Referring to FIG. 4, the receiver circuit 226 includes a broadband prefix amplifier 310, a Schmidt trigger 320, and a level shifter 330.

Since the broadband pulse signal has a broadband width of 125 MHz, the broadband prefix amplifier 310 has an input impedance of 50 ohm in order to transmit a maximum power to the receiving unit 220. Moreover, as illustrated in FIG. 3, since the broadband pulse signal appears as positive and negative pulse signals without a DC offset, the broadband prefix amplifier 310 amplifies the broadband pulse signal to sufficient amplitude without distortion. Thus, the broadband prefix amplifier 310 must have a sufficient broadband width equal to or greater than 125 MHz. The Schmidt trigger 320 stably triggers the broadband pulse signal, amplified to the sufficient amplitude using positive and negative reference voltages, into the positive and negative statuses. Next, the level shifter 330 shifts the triggered signal to a level of the signal required by the clock recovering circuit 222 and the data recovering circuit 224.

Since the phase of the digital signal recovered by the broadband signaling receiver circuit 226 may be different from that required by the host interface 205 due to a delay in the channel, a clock signal having a phase synchronized with the phase of the recovered digital signal is necessary. Due to this requirement, a clock and the data recovering circuit 224, which are required by an optical cable communication, a high-speed wired communication, and a high-speed serial link or interface, can be employed in a peer-to-peer data communication apparatus using human body. The clock recovering circuit 222 uses an own clock generator to recover a clock signal having a small jitter with the same phase as that of the frequency of the digital signal recovered by the broadband signaling receiver circuit 226. The data recovering circuit 224 uses the recovered clock signal such that the data signal having the jitter increased by the channel and the receiver circuit 226 is recovered into a clean digital signal having a synchronized phase. The recovered clock and data signal are transmitted to an external data processor (not shown) to process a desired function through the host interface 205.

As described above, since the data communication apparatus using human body according to the present invention is a peer-to-peer high-speed human body data communication apparatus having the direct coupling interface, the data communication apparatus can easily be used to transfer multimedia data such as music, a motion picture, or the like.

Figure 5:
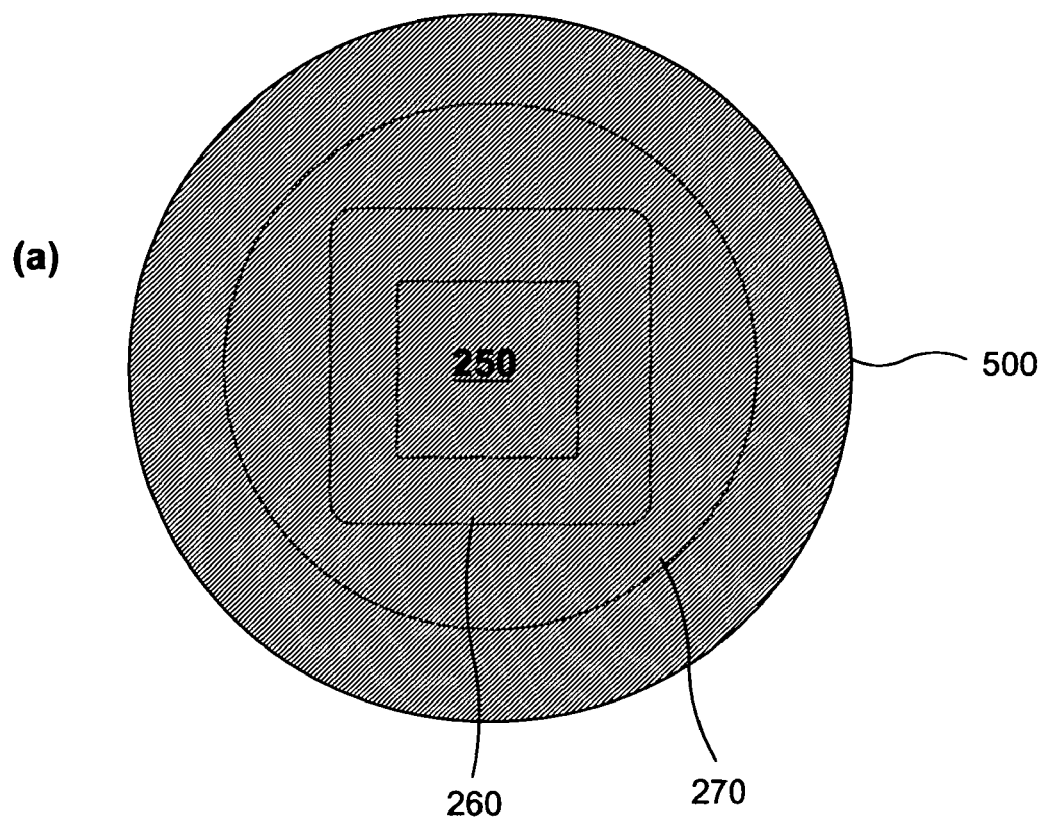
FIG. 5 is a view illustrating a data communication module using human body according to an embodiment of the present invention.
Figure 5:
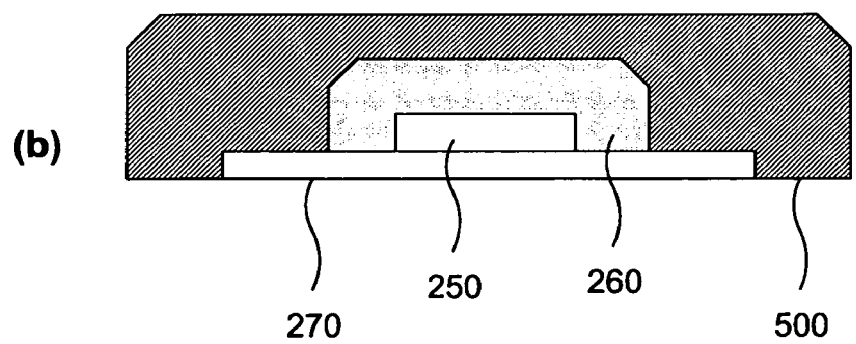

FIG. 5 is a view illustrating a data communication module using human body according to an embodiment of the present invention, wherein FIG. 5A is a plan view and FIG. 5B is a sectional view, respectively. The data communication module according to the embodiment of the present invention takes a shape such as an attachable pad, for example, an adhesive plaster that is easily attached to the human body and is widely used in practical life. Referring to FIG. 5, the integrated chip 250 illustrated in FIG. 2 is positioned in the central area of an adhesive plaster 500, and the battery 260 is installed like a thin film between the integrated chip 250 and the adhesive plaster 500 to supply an electric power to the integrated chip 250. A single thin signal electrode 270 is installed below the battery 260 and the integrated chip 250 to easily contact the human body and is connected to the integrated chip 250. Except for a side that the signal electrode 270 faces the human body, the battery 260, the integrated chip 250, and the opposite side of the signal electrode 270 are sealed in a vertical configuration by a material identical to that of the adhesive plaster. The adhesive plaster-shaped human body communication module as illustrated in FIG. 5 is designed for people to easily use the human body communication apparatus anytime anywhere in practical life. Thus, never to say, due to the development of the semiconductor technology and the manufacturing technology thereof, the size of the human body communication module can be remarkably reduced.

When an electronic device such as a wearable computing system is used in human body area, the convenience to use, the minimization, and low-power are important. Moreover, in order to process the multimedia data, the high-speed data communication is required. The data communication apparatus using human body and a module thereof does not require wires inconvenient to use and an antenna, and uses only a single electrode without a special sensor in comparison to the conventional human body communication so that it is convenient to use and the size thereof is minimized. Moreover, because of using the broadband signaling technology, the high-speed data communication is enabled with low power and is less sensitive to the low frequency noise, and the stable data communication is enabled regardless of the size of the electrode and the state of human body. Moreover, since there is no necessity for a ground required by the conventional human body communication system, the data communication apparatus using human body can be easily used anywhere and anytime.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data communication apparatus using human body comprising:
   a signal electrode capable of contacting the human body;
   a transmitting unit to transfer a digital data signal without modulation to the human body through the signal electrode;
   a receiving unit to detect a broadband pulse signal generated by the human body;
   a host interface to process a data signal to be transferred to the receiving unit and to transfer the processed data signal to the transmitting unit, and to allow the broadband data signal detected by the receiving unit to be processed at the exterior; and
   a single battery to supply an electric power to the data communication apparatus using human body.

2. The data communication apparatus using human body according to claim 1, wherein the receiving unit comprises:
- a broadband signaling receiver circuit;
- a clock recovering circuit to use own clock generator to recover a clock signal having a small jitter with a phase identical to that of a frequency of the broadband pulse data signal received from the broadband signaling receiver circuit; and
- a data recovering circuit to use the recovered clock signal to recover the broadband data signal into a clean digital data signal.

3. The data communication apparatus using human body according to claim 2, wherein the broadband signaling receiver circuit has an input impedance of 50 ohm.

4. The data communication apparatus using human body according to claim 2, wherein the broadband signaling receiver circuit comprises:
- a broadband prefix amplifier to the detected broadband pulse signal generated in the human body to a broadband pulse signal with a sufficient amplitude;
- a Schmidt trigger to trigger the broadband pulse signal amplified by the broadband prefix amplifier into stable positive and negative statuses; and
- a level shifter to shift the triggered broadband pulse signal to a broadband pulse signal at a level required by the clock recovering circuit and the data recovering circuit.

5. The data communication apparatus using human body according to claim 1, wherein the transmitting unit comprises:
- a clock synthesizer to synthesize a clock signal for a human body communication using a clock received from the host interface as a reference clock signal;
- a data retimer to retime a phase of a data signal received from the host interface to be synchronized with that of the clock signal using the synthesized clock signal; and
- a transmitter circuit to transfer the retimed data signal to the human body.

6. A data communication module using human body comprising:
- a directly coupling interface formed by
- an adhesive pad,
- a signal electrode to contact the human body;
- a transmitting unit to transfer a digital signal without modulation to the human body through the signal electrode;
- a receiving unit to detect a broadband pulse signal generated in the human body;
- a host interface to process a data signal to be transferred to the receiving unit and to transfer the processed data signal to the transmitting unit, and to allow the broadband data signal detected by the receiving unit to be processed at the exterior; and
- a single battery to supply an electric power to the data communication module using human body; wherein
- the transmitting unit, the receiving unit, and the host interface are formed in a signal integrated chip, and the signal electrode, the integrated chip, and the battery are installed in the adhesive pad.

7. The data communication module using human body according to claim 6, wherein, except for a side that the signal electrode faces the human body, the battery, the integrated chip, and the opposite side of the signal electrode are sealed in a vertical configuration by a material identical to that of the adhesive pad.

* * * * *